United States Patent
Cen et al.

(10) Patent No.: US 12,431,680 B2
(45) Date of Patent: Sep. 30, 2025

(54) SLIP RING APPARATUS, YAW SYSTEM, AND WIND TURBINE GENERATOR SET

(71) Applicant: BEIJING GOLDWIND SCIENCE & CREATION WINDPOWER EQUIPMENT CO., LTD., Beijing (CN)

(72) Inventors: Xianfu Cen, Beijing (CN); Weifeng Gu, Beijing (CN); Jiankun Chu, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 18/260,233

(22) PCT Filed: Sep. 28, 2021

(86) PCT No.: PCT/CN2021/121337
§ 371 (c)(1),
(2) Date: Jun. 30, 2023

(87) PCT Pub. No.: WO2022/142542
PCT Pub. Date: Jul. 7, 2022

(65) Prior Publication Data
US 2024/0072503 A1      Feb. 29, 2024

(30) Foreign Application Priority Data
Dec. 31, 2020  (CN) .......................... 202011624096.0

(51) Int. Cl.
*H01R 39/08*  (2006.01)
*F03D 7/02*  (2006.01)
(Continued)

(52) U.S. Cl.
CPC ............ *H01R 39/08* (2013.01); *F03D 7/0204* (2013.01); *F03D 80/00* (2016.05); *H01R 39/18* (2013.01); *F05D 2260/20* (2013.01)

(58) Field of Classification Search
CPC ....... H01R 39/08; H01R 39/18; F03D 7/0204; F03D 80/00
See application file for complete search history.

(56) References Cited

U.S. PATENT DOCUMENTS

| 5,466,979 A | 11/1995 | Bryant et al. |
| 2004/0242025 A1 | 12/2004 | Angerpointer et al. |

(Continued)

FOREIGN PATENT DOCUMENTS

| CN | 200944552 Y | 9/2007 |
| CN | 201113686 Y | 9/2008 |

(Continued)

OTHER PUBLICATIONS

CN-210779408-U, Jun. 16, 2020 ; Yin et al. English Translation (Year: 2024).*

(Continued)

*Primary Examiner* — Nathaniel E Wiehe
*Assistant Examiner* — Aye S Htay
(74) *Attorney, Agent, or Firm* — Bayes PLLC

(57) ABSTRACT

A slip ring apparatus, a yaw system, and a wind turbine generator set are provided. The slip ring apparatus includes a rotating part and a fixed part, the rotating part can rotate relative to the fixed part, a conductive ring is provided on the rotating part, an electric brush is provided on the fixed part, and a chute is formed in at least one of the conductive ring and the electric brush, so that when the conductive ring and the electric brush are in contact, the chute can discharge abrasive dust generated when the conductive ring and the brush are in contact, thereby suppressing the increase of (Continued)

fretting contact resistance between the conductive ring and the electric brush.

20 Claims, 2 Drawing Sheets

(51) Int. Cl.
*F03D 80/00* (2016.01)
*H01R 39/18* (2006.01)

(56) References Cited

U.S. PATENT DOCUMENTS

| | | | |
|---|---|---|---|
| 2006/0081516 A1* | 4/2006 | Hendrickson | B07B 15/00 209/707 |
| 2013/0224013 A1* | 8/2013 | De Broe | H01F 38/18 415/213.1 |
| 2014/0255151 A1* | 9/2014 | Jensen | F03D 1/04 415/121.3 |

FOREIGN PATENT DOCUMENTS

| | | | |
|---|---|---|---|
| CN | 201498859 U | | 6/2010 |
| CN | 201515292 U | | 6/2010 |
| CN | 102447351 A | | 5/2012 |
| CN | 104330653 A | * | 2/2015 |
| CN | 106887783 A | | 6/2017 |
| CN | 107482852 A | | 12/2017 |
| CN | 207765765 U | | 8/2018 |
| CN | 210779408 U | * | 6/2020 |
| DE | 10324708 A1 | | 12/2004 |
| EP | 0234427 B1 | | 5/1990 |
| GB | 2256753 A | | 12/1992 |
| JP | S62118732 | * | 5/1987 |
| JP | 2010119258 A | * | 5/2010 |

OTHER PUBLICATIONS

JP-2010119258-A, May 27, 2010, Asaumi et al.; English Translation (Year: 2024).*
CN-104330653-A, Feb. 4 2015, Zhang et al.; English Translation (Year: 2024).*
English Translation of JP S62118732 (Mabuchi; May 3, 1987) (Year: 2024).*
International Search Report in related PCT Application No. PCT/CN2021/121337 dated Dec. 6, 2021 (6 pages).
Supplementary European Search Report in related European Application No. 21913287.5 dated Jun. 7, 2024 (7 pages).
Office Action in related Korean Application No. 10-2023-7025232 dated Apr. 23, 2025 (13 pages).
Australian Second Examination Report in related Australian Application No. 2021412148 dated Jan. 7, 2025 (6 pages).

* cited by examiner

SLIP RING APPARATUS, YAW SYSTEM, AND WIND TURBINE GENERATOR SET

CROSS-REFERENCE TO RELATED APPLICATIONS

This application is the national phase of International Application No. PCT/CN2021/121337, filed on Sep. 28, 2021, which claims the priority to Chinese Patent Application No. 202011624096.0, filed on Dec. 31, 2020. The entire contents of each of the above-identified applications are expressly incorporated herein by reference.

TECHNICAL FIELD

The present application relates to the technical field of wind power generation, and in particular to a slip ring device, a yaw system and a wind turbine.

BACKGROUND

Generators applied in current wind turbines mainly include a direct-drive permanent magnet generator, a medium-speed permanent magnet generator and a doubly-fed asynchronous generator (electric excitation). All the three types of generators need to be equipped with an electric pitch slip ring or an electro-hydraulic slip ring in the impeller system to transmit power and signals. In addition, the doubly-fed asynchronous generator needs to be equipped with a motor collector ring for electric excitation and transmission of rotor-side electric energy. The electric pitch slip ring or electro-hydraulic slip ring or motor collector ring each has a similar structure, including a conductive ring and a brush. The pitch slip ring works in a low-speed (average speed of 10 rpm to 20 rpm) sliding electric contact state, and the motor collector ring works in a high-speed (average speed of 1500 rpm) electric contact state. However, the collector ring used in the yaw system of wind turbine works in the low frequency and ultra-low speed electrical contact state. The electrical contact between, the conductive ring in the slip ring or motor collector ring, and, the corresponding brush, in each of the above different application scenarios has its different design characteristics and failure modes.

The pitch slip ring works at medium and low speed, which is mainly used to transmit high-frequency communication signals, and reliable signal transmission is the most important purpose. The motor collector ring works at high speed, which is mainly used to transmit the rotor-side electric energy, and the high-speed wear, heat generation and mechanical jump of the brush are the most important purposes. However, the collector ring used in the yaw system may be in a long-term static (working in sliding condition for a small part of the time), ultra-low speed and intermittent sliding condition, and the heat generation and increase of the contact resistance are the most important research purpose.

In the process of developing the collector ring of the yaw system, it is found that the black film layer is gradually attached between the contact pair of the conductive ring and the brush with the increase of running time, and its contact resistance increases too fast. However, there is no similar phenomenon appeared in the motor collector ring running at high speed.

The rotating speed of the collector ring in the yaw system is about 0.05 r/min, and the linear speed of the brush is about 1 mm/s, which belongs to intermittent working system. The wear law at low rotating speed conforms to fretting wear, which is a typical compound wear. Since mechanical and chemical wear may be caused by two contacting objects moving relative to each other with small amplitude (less than 1 mm), when two contacting objects are rubbing with each other, fatigue cracks or adhesive wear may be formed on the friction surface layer, which makes the metal peel off and form wear debris or wear particles, thus resulting in oxidation of the wear debris due to the high temperature of the friction surface.

During the long-term low-speed and intermittent rotation, fretting wear may appear on the contact of the conductive ring and the brush of the collector ring of the yaw system, and wear particles are attached to the contact surface between the brush and the conductive ring. The fretting travel is small, and the wear particles are rarely discharged during the rotation due to the large brush contact surface and the large roughness of the brush contact surface. Thus, the wear particles are mixed between the contact pairs and are repeatedly ground, and are gradually oxidized with impurities, oxygen and high-temperature environment, eventually forming an oxide film that blocks the passage of current, and resulting in an increase in the film resistance in the fretting contact resistance, which causes an excessive increase in the fretting contact resistance. Fretting contact resistance is the resistance formed between the contact pair of the conductive ring and the brush during the low-speed and intermittent rotation.

SUMMARY

The present application is provided in view of the above problems. An object of the present application is to provide a slip ring device, which can suppress the increase of fretting contact resistance between a conductive ring and a brush in the slip ring device.

In order to achieve the above object, a slip ring device is provided according to the present application, which includes a rotating part and a fixed part. The rotating part can rotate relative to the fixed part. A conductive ring is provided on the rotating part, and a brush is provided on the fixed part. An inclined slot is provided on at least one of the conductive ring and the brush, so that when the conductive ring and the brush are in contact, the inclined slot can discharge the wear debris generated as the conductive ring and the brush are in contact.

A yaw system is further provided according to the present application, including the slip ring device as described above, which is arranged on a yaw platform between an installation position of a tower and a nacelle; and a control unit, which is arranged on the fixed part of the slip ring device and used to control the activation and deactivation of a heat dissipation device based on a temperature signal measured by a temperature sensor.

A wind turbine is further provided according to the present application, including the yaw system as described above.

According to the slip ring device provided according to the present application, the increase of fretting contact resistance between the conductive ring and the brush in the slip ring device can be effectively suppressed by selecting materials of related components, improving surface processing technology and structure, and controlling and optimizing working temperature and working current, so that the formation of wear debris can be reduced, and the wear debris can be discharged in time, thereby reducing the oxide film formed by the wear debris and softening the oxide film.

DESCRIPTION OF DRAWINGS

The above and other aspects, features and advantages of the present application will become more apparent and more easily understood from the following detailed description of exemplary embodiments of the present application with reference to the accompanying drawings, in the drawings.

Figure 1:
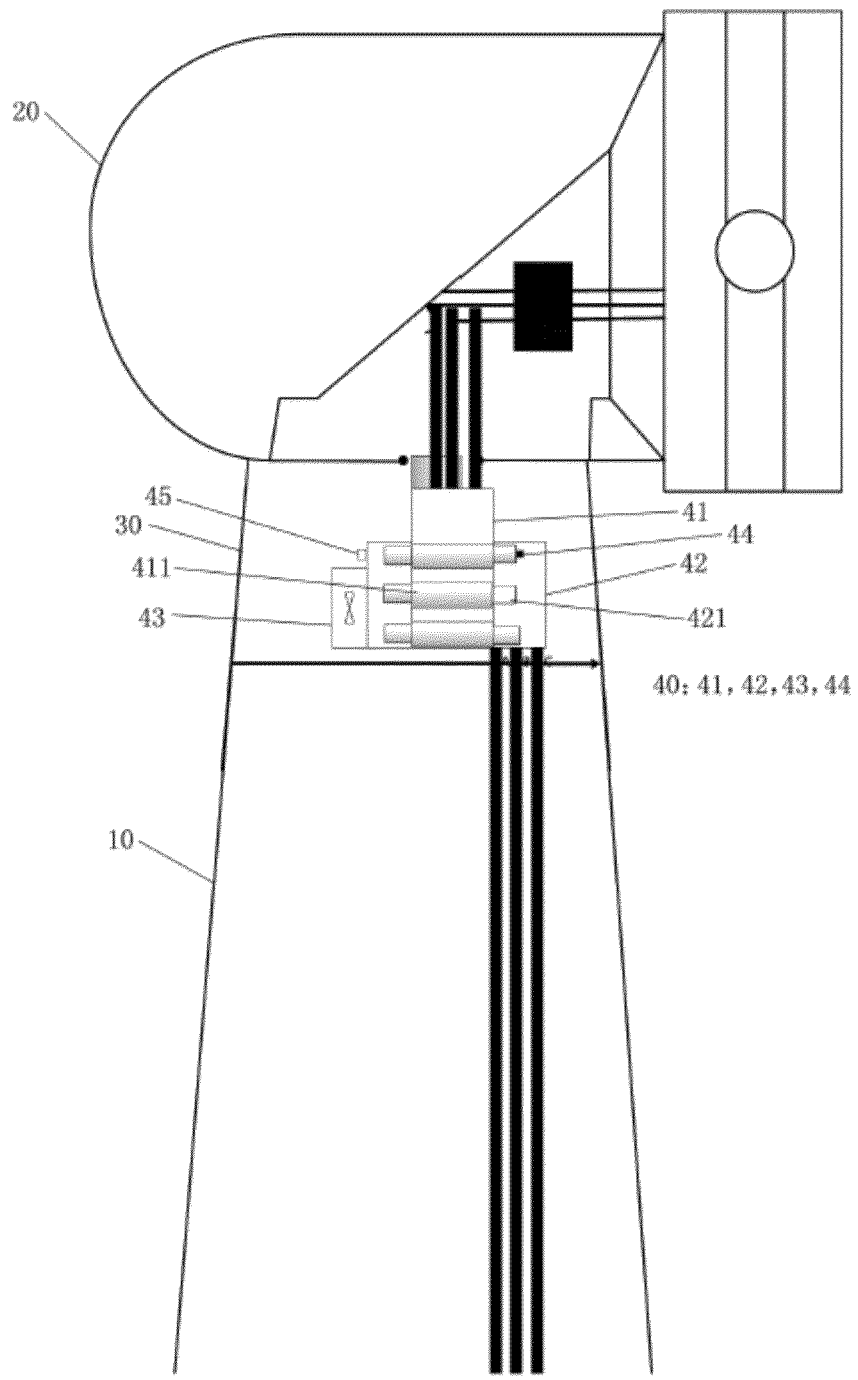
FIG. 1 is a schematic view showing a composition of a yaw system according to the present application.

Reference numerals in the drawings are as follows:

| | |
|---|---|
| 10 tower; | 20 nacelle; |
| 30 yaw platform; | 40 slip ring device; |
| 41 rotating part; | 411 conductive ring; |
| 42 fixed part; | 421 brush; |
| 412, 422 inclined slot; | 43 heat dissipation device; |
| 44 temperature sensor; | 45 control unit. |

DETAILED DESCRIPTION

Hereinafter, preferred embodiments of the present application are described in detail with reference to the accompanying drawings. It should be clear that in the following description of the embodiments and accompanying drawings, the same parts are labeled with the same symbols and repeated descriptions are omitted.

A slip ring device is provided according to the present application, which can suppress an increase of fretting contact resistance. In the following, the slip ring device is described by taking a collector ring of a yaw system as an example, and the slip ring device includes a conductive ring and a brush. The present application is not limited to this, and the following description can also be applied to other similar devices that need to suppress the increase of fretting contact resistance between contact pairs.

As shown in FIG. 1, a yaw system for a wind turbine is shown. The yaw system includes a yaw platform 30 located between a tower 10 and a nacelle 20, and a slip ring device 40 (a collector ring of the yaw system, in this example) is arranged in the yaw platform 30.

The slip ring device 40 includes a rotating part 41 and a fixed part 42. The connection between the rotating part 41 and the fixed part 42 is similar to the connection between a rotor and a stator in a generator. The fixed part 42 is similar to the stator and has a cylindrical shape with a cylindrical cavity inside. The rotating part 41 is similar to the rotor and has a cylindrical shape, and is arranged in the cavity inside the fixed part 42. The rotating part 41 can rotate relative to the fixed part 42. The movement relationship between the rotating part 41 and the fixed part 42 shown in the figure can be interchanged, that is, the rotating part 41 can be fixed and the fixed part 42 can rotate relative to the rotating part 41. In addition, specific structures of the rotating part 41 and the fixed part 42 are only examples, and other structures are possible as long as they can move relative to each other. For example, the rotating part 41 and the fixed part 42 can rotate relative to each other similar to a pair of externally meshed gears.

An annular conductive ring 411 is provided on an outer circumferential surface of the rotating part 41, and a brush 421 is provided on an inner circumferential surface of the fixed part 42 at a position corresponding to the conductive ring 411. The conductive ring 411 and the brush 421 are in contact with each other and rotate relative to each other, and are connected to different cable sections of the wind turbine (as shown by the thick solid line in FIG. 1), so that the current generated by the generator is transmitted through the conductive ring and the brush. Three sets of conductive ring and corresponding brush are shown in FIG. 1, but it is not limited thereto, and more or fewer sets of conductive ring and brush may be provided depending on the actual engineering application.

The slip ring device 40 further includes a heat dissipation device 43 arranged outside the fixed part 42 for dissipating heat from the slip ring device 40, but it is not limited thereto, and the heat dissipation device 43 may also be arranged inside the fixed part 42 for dissipating heat from the conductive ring 411 and the brush 421.

The slip ring device 40 also includes a temperature sensor 44 provided on the brush 421 for detecting the temperature of the brush 421, but it is not limited thereto, and the temperature sensor 44 may also be provided on the conductive ring 411, for example, buried in the conductive ring 411, for detecting the temperature of both the conductive ring 411 and the brush 421.

The yaw system further includes a control unit 45 arranged on the fixed part 42 of the slip ring device 40, which is used to control activation and deactivation of the heat dissipation device 43 based on a temperature signal measured by the temperature sensor 44, so as to realize the heat dissipation of the slip ring device 40.

The fretting contact resistance between a contact pair, that is, the conductive ring 411 and the brush 421 in the slip ring device 40 is mainly caused by the fact that the wear debris generated by the fretting wear between the contact pair cannot be discharged in time and accumulates between the contact surface of the contact pair, and gradually oxidizes into an oxide film with oxygen and high temperature, and the oxide film hinders the passage of current.

Therefore, the slip ring device 40 according to the present application may suppresses the increase of the fretting contact resistance between the contact pair by reducing the generation of wear debris, discharging wear debris to reduce the accumulation of wear debris, controlling the working temperature to slow down the oxidation of wear debris, and controlling and optimizing working current to soften the oxide film.

Figure 2:
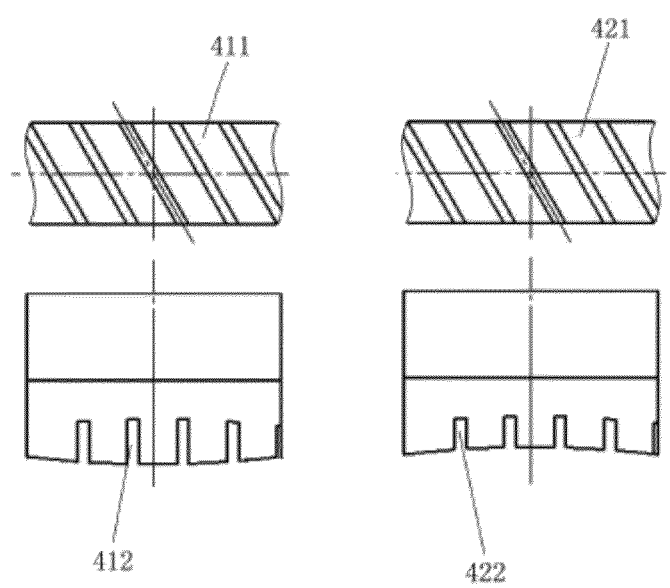
FIG. 2 is a schematic structural view showing part of a conductive ring and a brush in a slip ring device according to the present application.

With reference to FIG. 2, a part of the structure of the conductive ring 411 and the brush 421 of the slip ring device 40 is shown. The conductive ring 411 and the brush 421 are not shown in real size and scale, but are exaggerated or reduced to schematically show certain details. An inclined slot can be provided on at least one of the conductive ring 411 and the brush 421, and the aim thereof is to timely discharge the wear debris generated when the conductive ring 411 and the brush 421 are in contact, so as to avoid the accumulation of the wear debris on the contact surface between the conductive ring and the brush. With reference to FIG. 2, inclined slots 422 of brush 421 are indented into brush 421, and inclined slots 412 of conductive ring 411 are indented into conductive ring 411.

As shown in FIG. 1, an inclined slot 412 and an inclined slot 422 are respectively provided on the conductive ring 411 and the brush 421. These inclined slots each is inclined at a certain angle relative to a circumferential extension direction of the conductive ring 411 and the brush 421, and the inclined slot 412 on the conductive ring 411 can be in a form of a spiral slot, and processing of the inclined slot can be realized by a horizontal milling machine, etc. The inclination angle of the inclined slot is larger than a repose angle of the brush material and the conductive ring material, so that the wear debris formed on the brush 421 and the conductive ring 411 are smoothly discharged along the inclined slot under the action of their own gravity, thus reducing the accumulation of wear debris on the contact surface and in the inclined slot.

The repose angle is a concept related to the mobility of a material. When the material is placed on an inclined surface, the material remains stable as the inclination angle of the inclined surface with respect to the horizontal direction is less than the repose angle, and the material overcomes the friction between itself and the inclined surface under the action of its own gravity and flows along the inclined surface as the inclination angle of the inclined surface is greater than the repose angle. The repose angle is related to the physical and chemical properties such as the density and molecular structure of the material, as well as the type, particle size, shape and moisture content of the material particle. Different materials have different repose angles and can be obtained from reference books or through experimental measurements. Generally, the brush material and the conductive ring material have different properties, so they have different repose angles, and when the inclination angle of the inclined slot is set, it should be subjected to the larger repose angle of the two materials. The brush material is described as an example herein, that is, the inclination angle of the inclined slot is greater than the repose angle of the brush material. For example, the inclination angle of the inclined slot can range from 45 degrees to 90 degrees, preferably 60 degrees, but it is not limited thereto. In specific engineering practice, the inclination angle of the inclined slot can be set by considering the repose angle of both the brush material and the conductive ring material to facilitate the discharge of wear debris.

The directions of the inclined slots respectively on the conductive ring 411 and the brush 421 can be the same, so that when the conductive ring 411 and the brush 421 are in contact with each other and rotate relative to each other, the inclined slot 412 on the conductive ring 411 and the inclined slot 422 on the brush 421 may cross each other to form a scissor, so as to provide a shearing effect, and to ensure the crossed inclined slots act as scissors to remove the generated wear debris and oxides formed by the wear debris to reduce their adhesion no matter the conductive ring and the brush rotate forward or backward when they are in fretting contact. The depth of the inclined slot can range from, for example, 1 mm to 4 mm, preferably 3 mm to accommodate the formed wear debris. The width of the inclined slot may be set in a manner such that an area occupied by all of the inclined slots formed on the conductive ring 411 and the brush 421 is a certain proportion of an area of the contact surface between the conductive ring 411 and the brush 421, thereby facilitating the driving of the formed wear debris into the inclined slots by shearing effect. When inclined slots are arranged on both the conductive ring 411 and the brush 421, the inclined slots can be distributed more evenly, while when inclined slots are arranged on one of the conductive ring 411 and the brush 421, the inclined slots are distributed more densely, and the area occupied by all of the inclined slots can be, for example, 1/6 to 1/3 of the area of the contact surface between the conductive ring 411 and the brush 421, but it is not limited thereto. The above numerical values of the depth and width of the inclined slots are only examples, and the specific numerical values can be correspondingly adjusted according to the engineering practice. The area of the contact surface between the conductive ring 411 and the brush 421 mentioned here refers to the area of the contact surface between the conductive ring 411 and the brush 421 in the case that neither of them is provided with the inclined slots.

In addition, the arrangement of the inclined slots is also beneficial to the heat dissipation of the brush 421 and the conductive ring 411, and at the same time, it can significantly reduce the travel of the debris from the center position to the edge position of the contact surface, thus overall reducing the probability of debris accumulation.

In addition, the materials of the conductive ring 411 and the brush 421 can be selected so as to reduce wear when they are in contact and rotating to each other. The conductive ring 411 can be made of a material with relatively high hardness, and the brush 421 can be made of a material with relatively low hardness and low friction coefficient. For example, the conductive ring 411 can be made of copper plated silver antimony alloy, using the copper plated silver antimony process, and the brush 421 can be made of copper carbon composite material, where the copper content of the copper carbon composite material is 80% or more, but it is not limited thereto. This is only an example, and the conductive ring 411 and brush 421 can be made of other suitable materials.

In addition, fatigue cracks or adhesive wear may be generated on the contact surface when the contact pair, that is, the conductive ring 411 and the brush 421, are rotating, thus in the process of manufacturing the conductive ring 411 and the brush 421, adhesive materials such as adhesives will not be used, so as to reduce the adhesive wear of the finished conductive ring 411 and the brush 421 when they are in contact and rotating relative to each other.

In addition, the roughness of the surfaces of the conductive ring 411 and the brush 421 in contact with each other can be reduced, so that the generation of wear debris can be reduced during the contact and rotation. For example, the roughness of the surfaces of the conductive ring 411 and the brush 421 in contact with each other is less than or equal to 0.1 μm, but it is not limited thereto. This value is only an example, and the corresponding roughness can be selected based on the specific engineering practice, and the surfaces of the conductive ring 411 and the brush 421 can be machined by a lathe and a grinding device.

The slip ring device 40 according to the present application can further control the operating temperature to achieve the suppression of the increase of fretting contact resistance. Generally, the temperature rise of the brush 421 is more obvious than that of the conductive ring 411 due to its material in the actual working process. Therefore, the following description takes the brush 421 as an example, but it is not limited thereto, and similar measures can also be applied to the conductive ring 411. The temperature control for the brush 421 is mainly realized by heat dissipation design. For example, the temperature of the brush 421 may be controlled to be lower than a critical rapid oxidation temperature of the brush 421 by using a heat dissipation device 43 (for example, a fan), and the critical rapid oxidation temperature of the brush 421 means that the fretting contact resistance between the conductive ring 411 and the brush 421 increases rapidly when the temperature is higher than this critical rapid oxidation temperature, which may be obtained by experimental measurement.

Specifically, in this experiment, the conductive ring 411 and the brush 421 are operated to rotate, and they are in a fretting contact state, and the conductive ring 411 and the brush 421 are energized (i.e., current is made to flow through both), so that the temperature of the conductive ring 411 and the brush 421 are increased. The temperatures are measured in real time by the temperature sensor 44, and at the same time, the voltage and current between the conductive ring 411 and the brush 421 are measured in real time by a voltmeter and an ammeter respectively, so as to calculate the fretting contact resistance between them, or the fretting contact resistance between them can be measured directly by a resistance measuring device (for example, a resistance meter). A curve can be drawn with temperature as an independent variable and fretting contact resistance as a dependent variable, so as to obtain the relationship between the resistance and the temperature (that is, the resistance increase rate curve). The rate of resistance increase with the temperature increase of the brush (or the temperature rise of the brush) can be seen from this curve, and an inflection point of the curve can be found, and when it is smaller than the inflection point (that is, lower than this temperature inflection point), the resistance increases slowly, while when it is larger than the inflection point (that is, higher than this temperature inflection point), the resistance increases rapidly. This temperature inflection point is called the critical rapid oxidation temperature of the brush 421, which means that once the temperature is higher than this critical rapid oxidation temperature, the wear debris are rapidly oxidized into oxide films, thus resulting in the rapid increase of the fretting contact resistance. Therefore, the temperature of the brush should be controlled to be lower than this critical rapid oxidation temperature to avoid the rapid increase of the fretting contact resistance.

Accordingly, in the actual operation of the conductive ring 411 and the brush 421, the temperatures of the conductive ring 411 and the brush 421 are measured in real time by the temperature sensor 44, and the brush 421 is controlled by the control unit 45 in a feed forward way, that is, when the temperature of the brush is higher than the threshold temperature (which is lower than the critical rapid oxidation temperature of the brush), the heat dissipation device 43 is activated by the control unit 45 to dissipate heat for the brush 421, and when the temperature of the brush is lower than the threshold temperature, the heat dissipation device 43 may be deactivate and stopped to dissipate heat for the brush, so as to keep the temperature of the brush 421 below the critical rapid oxidation temperature of the brush 421. For example, through the above-mentioned heat dissipation measures, the temperature rise of the brush can be controlled to be not higher than 20K, and the temperature of the brush can be guaranteed to be not higher than 85° C. for a long time, where K stands for Kelvin temperature. The specific values of the brush temperature rise and the brush temperature are only examples, and they are not limited thereto, but based on the critical rapid oxidation temperatures of the used brush 421 and the conductive ring 411. By using low temperature to slow down the rapid generation of oxide from the wear debris, the wear debris can be discharged before the oxide is generated, and the existence of wear debris between the contact pair can be reduced, and at the same time, the oxidation rate can be reduced, so that the oxide film can be softened. Although the slow oxidation of wear debris particles in open space is inevitable, the above measures can control its oxidation to be slower, and the oxide film to be thinner, which can keep its controllable electrical contact performance.

The slip ring device 40 according to the present application can further achieve the suppression of the increase of fretting contact resistance by controlling the current within the optimal flow value range. For the formed oxide film, a small current cannot break through it, while a large current can soften the thin oxide film, but an excessive current will cause the contact surface between the conductive ring 411 and the brush 421 to melt. When the fretting contact resistance increases, the contact voltage under the superposition of large current become higher, so that the thin oxide film can be softened by the large current, and the above-mentioned discharge prevents the formation of multi-layer oxide film, which finally makes the fretting contact resistance stable in a low equilibrium state.

Since the wear of the brush 421 is obvious, and most of the debris materials formed is brush materials, the brush 421 is described as an example below. Specifically, for the oxide film formed by the brush material, the current should be controlled to be able to soften the oxide film, but at the same time, it should not cause the contact surface between the conductive ring 411 and the brush 421 to be melted, that is, the current/flowing between the conductive ring 411 and the brush 421 meets the following conditions: $Ua/Rs<I<Ub/Rs$, where Ua is the softening voltage of the brush material and Ub is the melting voltage of the brush material. Rs is the static contact resistance between the conductive ring 411 and the brush 421, which is the resistance between the conductive ring 411 and the brush 421 in the non-working state (that is, the static state). For a specific brush material, Ua and Ub can be obtained through a reference book, and Rs can be obtained through experimental measurement. For example, a voltage is applied and measured between the conductive ring 411 and the brush 421, and the current flowing between the conductive ring 411 and the brush 421 is measured at the time same, and the average value is calculated from multiple measurements to finally obtain the static contact resistance Rs between the conductive ring 411 and the brush 421.

In actual engineering operation, based on the number of the brush 421 and the measured static contact resistance Rs, the voltage applied between brushes 421 is controlled so that the current I flowing through each brush 421 meets the condition: $Ua/Rs<I<Ub/Rs$. For example, when the brush material is copper, the softening voltage of copper is 0.12V and the melting voltage is 0.43V, then the current passing through the brush 421 should make the contact voltage applied on the two ends of the brush 421 slightly higher than the softening voltage of copper and much lower than the melting voltage of copper.

From the above description, it is clear that the slip ring device according to the present application can effectively achieve the suppression of the increase of fretting contact resistance between the conductive ring and the brush in the slip ring device by selecting the materials of related components, improving the surface processing technology and structure, and controlling and optimizing the working temperature and current, so that the formation of wear debris can be reduced, and the wear debris can be discharged in time, thereby reducing the oxide film formed by the wear debris and softening the oxide film.

A yaw system is further provided according to the present application, including the slip ring device 40 as described above, which is arranged on a yaw platform 30 in the middle of the installation position of a tower 10 and a nacelle 20; and a control unit 45, which is arranged on the fixed part 42 of the slip ring device 40 and is used for controlling the activation and deactivation of the heat dissipation device 43 based on the temperature signal measured by the temperature sensor 44.

A wind turbine is further provided according to the present application, including the yaw system as described above.

The solutions in the above embodiments can be further combined or replaced with each other, and the solutions are only described for the preferred embodiments of the present application, rather than limitation on the concept and scope of the present application. Modifications and improvements made by the skilled in the art without deviating from the spirit of the present application fall within the scope of the present application.

The invention claimed is:

1. A slip ring device, comprising:
a rotating part; and
a fixed part,
wherein the rotating part is configured to rotate relative to the fixed part, a conductive ring is arranged on the rotating part, a brush is arranged on the fixed part, and one or more inclined slots are provided on at least one of the conductive ring or the brush,
wherein the one or more inclined slots comprise a first inclined slot provided on the brush and indented into the brush and a second inclined slot provided on the conductive ring and indented into the conductive ring,
wherein the first inclined slot on the brush is inclined at a first inclined angle relative to a circumferential extending direction of the conductive ring and the brush, the second inclined slot on the conductive ring is inclined at a second inclined angle relative to the circumferential extending direction of the conductive ring and the brush, and each of the first and second inclined angles is greater than a repose angle of a material of the brush and a repose angle of a material of the conductive ring, and
wherein when the conductive ring and the brush are in contact with each other, the one or more inclined slots are configured to discharge wear debris generated as the conductive ring and the brush are in contact.

2. The slip ring device according to claim 1, wherein when the conductive ring and the brush are in contact with each other, the second inclined slot on the conductive ring and the first inclined slot on the brush cross with each other.

3. The slip ring device according to claim 1, wherein the first or second inclined angle ranges from 45 degrees to 90 degrees.

4. The slip ring device according to claim 1, wherein a depth of each of the one or more inclined slots ranges from 1 mm to 4 mm, and an area occupied by the one or more inclined slots formed on at least one of the conductive ring or the brush is 1/6 to 1/5 of an area of a contact surface between the conductive ring and the brush.

5. The slip ring device according to claim 1, further comprising a heat dissipation device arranged on the fixing part, wherein in a working state, the heat dissipation device dissipates heat from the brush, and a temperature of the brush is controlled to be lower than a critical rapid oxidation temperature of the brush.

6. The slip ring device according to claim 5, wherein the critical rapid oxidation temperature of the brush is calculated based on a temperature rise of the brush and an increase rate of a fretting contact resistance between the conductive ring and the brush.

7. The slip ring device according to claim 6, further comprising a temperature sensor arranged on the brush for detecting the temperature of the brush, wherein the heat dissipation device is activated when the temperature of the brush is higher than a threshold temperature, and when the temperature of the brush is lower than the threshold temperature, the heat dissipation device is deactivated to control the temperature of the brush to be lower than the critical rapid oxidation temperature of the brush.

8. The slip ring device according to claim 6, wherein the temperature rise of the brush is controlled to be not higher than 20K and the temperature of the brush is not higher than 85° C. by means of the heat dissipation device.

9. The slip ring device according to claim 1, wherein a current flowing between the conductive ring and the brush is larger than a ratio of a softening voltage of a material of the brush to a static contact resistance between the conductive ring and the brush, and smaller than a ratio of a melting voltage of the material of the brush to the static contact resistance between the conductive ring and the brush.

10. The slip ring device according to claim 1, wherein the conductive ring is made of a copper plated silver antimony alloy, and the brush is made of a copper-carbon composite material.

11. The slip ring device according to claim 10, wherein a roughness of surfaces of the conductive ring and the brush in contact with each other is less than or equal to 0.1 μm.

12. A yaw system, comprising:
a slip ring device arranged on a yaw platform in a middle of an installation position of a tower and a nacelle, and comprising:
a rotating part;
a fixed part; and
a heat dissipation device arranged on the fixing part,
wherein the rotating part is configured to rotate relative to the fixed part, a conductive ring is arranged on the rotating part, a brush is arranged on the fixed part, and one or more inclined slots are provided on at least one of the conductive ring or the brush,
wherein the one or more inclined slots comprise a first inclined slot provided on the brush and indented into the brush and a second inclined slot provided on the conductive ring and indented into the conductive ring,
wherein the first inclined slot on the brush is inclined at a first inclined angle relative to a circumferential extending direction of the conductive ring and the brush, the second inclined slot on the conductive ring is inclined at a second inclined angle relative to the circumferential extending direction of the conductive ring and the brush, and each of the first and second inclined angles is greater than a repose angle of a material of the brush and a repose angle of a material of the conductive ring, and
wherein when the conductive ring and the brush are in contact with each other, the one or more inclined slots are configured to discharge wear debris generated as the conductive ring and the brush are in contact; and
a control unit arranged on the fixed part of the slip ring device and used for controlling activation and deactivation of the heat dissipation device based on a temperature signal measured by a temperature sensor.

13. The yaw system according to claim 12, wherein the first or second inclined angle ranges from 45 degrees to 90 degrees.

14. The yaw system according to claim 12, wherein a depth of each of the one or more inclined slots ranges from 1 mm to 4 mm, and an area occupied by the one or more inclined slots formed on at least one of the conductive ring or the brush is 1/6 to 1/5 of an area of a contact surface between the conductive ring and the brush.

15. The yaw system according to claim 12, wherein in a working state, the heat dissipation device dissipates heat from the brush, and a temperature of the brush is controlled to be lower than a critical rapid oxidation temperature of the brush.

16. The yaw system according to claim 15, wherein the critical rapid oxidation temperature of the brush is calculated based on a temperature rise of the brush and an increase rate of a fretting contact resistance between the conductive ring and the brush.

17. The yaw system according to claim 16, wherein the slip ring device further comprises the temperature sensor arranged on the brush for detecting the temperature of the brush, wherein the heat dissipation device is activated when the temperature of the brush is higher than a threshold temperature, and when the temperature of the brush is lower than the threshold temperature, the heat dissipation device is deactivated to control the temperature of the brush to be lower than the critical rapid oxidation temperature of the brush.

18. The yaw system according to claim 17, wherein the temperature rise of the brush is controlled to be not higher than 20K and the temperature of the brush is not higher than 85° C. by means of the heat dissipation device.

19. The yaw system according to claim 12, wherein a current flowing between the conductive ring and the brush is larger than a ratio of a softening voltage of a material of the brush to a static contact resistance between the conductive ring and the brush, and smaller than a ratio of a melting voltage of the material of the brush to the static contact resistance between the conductive ring and the brush.

20. A wind turbine, comprising:
  a yaw system comprising:
    a slip ring device arranged on a yaw platform in a middle of an installation position of a tower and a nacelle, and comprising:
      a rotating part;
      a fixed part; and
      a heat dissipation device arranged on the fixing part, wherein the rotating part is configured to rotate relative to the fixed part, a conductive ring is arranged on the rotating part, a brush is arranged on the fixed part, and one or more inclined slots are provided on at least one of the conductive ring or the brush,
      wherein the one or more inclined slots comprise a first inclined slot provided on the brush and indented into the brush and a second inclined slot provided on the conductive ring and indented into the conductive ring,
      wherein the first inclined slot on the brush is inclined at a first inclined angle relative to a circumferential extending direction of the conductive ring and the brush, the second inclined slot on the conductive ring is inclined at a second inclined angle relative to the circumferential extending direction of the conductive ring and the brush, and each of the first and second inclined angles is greater than a repose angle of a material of the brush and a repose angle of a material of the conductive ring, and
      wherein when the conductive ring and the brush are in contact with each other, the one or more inclined slots are configured to discharge wear debris generated as the conductive ring and the brush are in contact; and
    a control unit arranged on the fixed part of the slip ring device and used for controlling activation and deactivation of the heat dissipation device based on a temperature signal measured by a temperature sensor; and
  a generator coupled to the yaw system.

* * * * *